United States Patent

[11] 3,593,957

[72] Inventors Paul A. Dolter
  Roselle;
  William R. McCarty, Jr., Skokie; Wesley S.
  Swanson, Elk Grove Village, all of, Ill.
[21] Appl. No. 850,572
[22] Filed Aug. 15, 1969
[45] Patented July 20, 1971
[73] Assignee Eaton Yale & Towne, Inc.
  Cleveland, Ohio

[54] DIAPHRAGM ASSEMBLY FOR PRESSURE OPERATED PILOT CONTROLLED SHUTOFF VALVE
10 Claims, 7 Drawing Figs.
[52] U.S. Cl. .............................................. 251/30,
  251/38
[51] Int. Cl. ............................................ F16k 31/385,
  F16k 31/40
[50] Field of Search ...................................... 251/30, 38,
  368, 39

[56] References Cited
UNITED STATES PATENTS
2,017,840 10/1935 Brooks ........................ 251/38
2,870,986 1/1959 Vargo ......................... 251/30 X
2,936,780 5/1960 Pratt .......................... 251/38 X
3,385,560 5/1968 Hare .......................... 251/368 X
3,439,896 4/1969 Worst ........................ 251/38
FOREIGN PATENTS
1,401,763 4/1965 France ........................ 251/30
  625,605 7/1949 Great Britain .............. 251/30
1,141,240 1/1969 Great Britain ................ 251/30

Primary Examiner—Arnold Rosenthal
Attorney—Hill, Sherman, Meroni, Gross and Simpson ABSTRACT: Fluid pressure operated pilot controlled diaphragm valve. The diaphragm forming the valve has a marginal sealing portion, an annular thin-walled bellowslike portion extending radially inwardly of the sealing portion and a disclike central portion extending inwardly of the thin-walled bellowslike portion. A plastic insert rigidly backs up the disclike portion of the diaphragm and has a guide boss leading through the disclike portion of the diaphragm, having a central pilot orifice leading therethrough. The insert has a bleed hole of smaller cross-sectional area than the cross-sectional area of the pilot orifice leading therethrough. The diaphragm has a series of bleed holes leading therethrough. A communicating passageway is provided between the bleed holes in the disclike portion of the diaphragm and the bleed hole leading through the plastic insert. The bleed holes leading through the diaphragm serve as a screen to prevent dirt from clogging the bleed hole leading through the plastic insert.

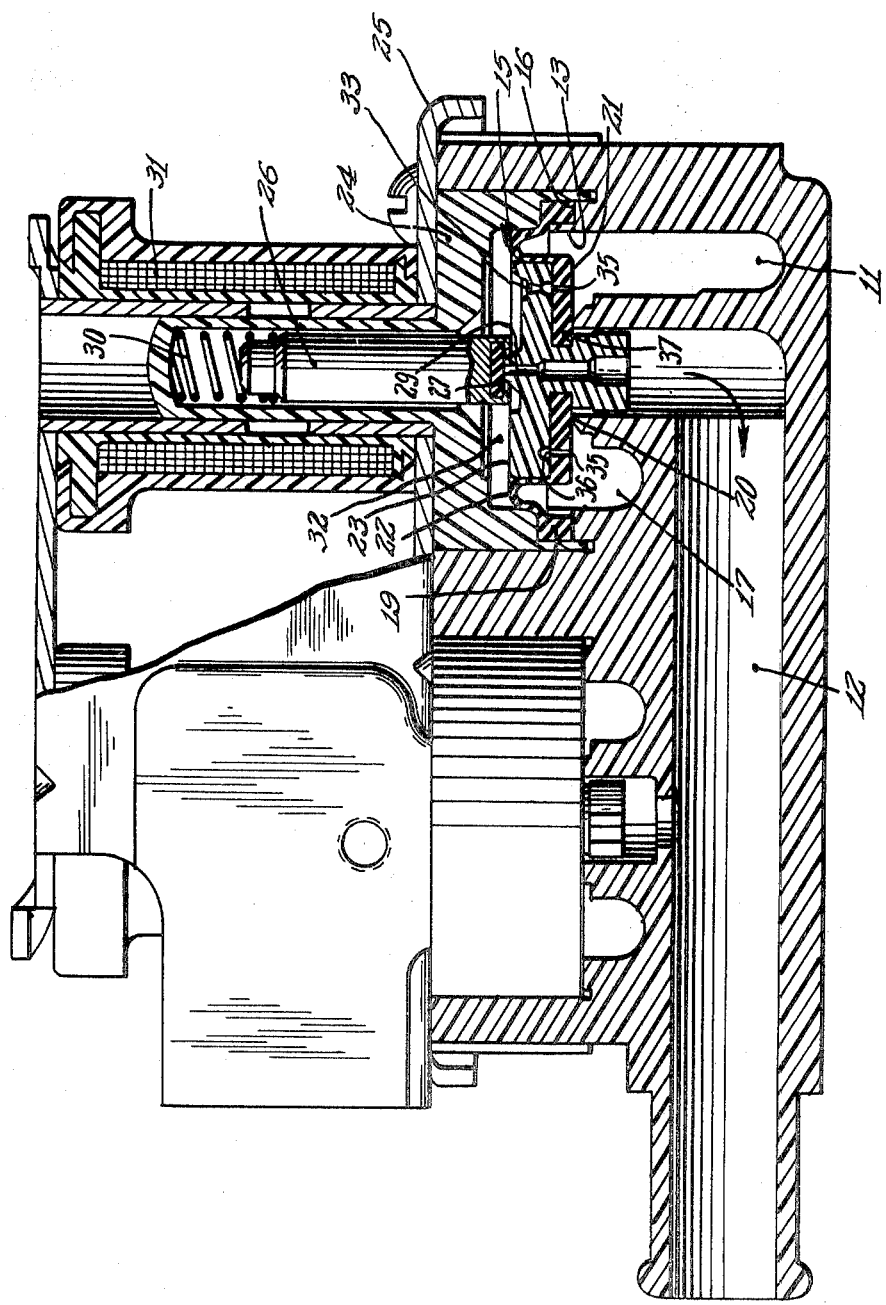

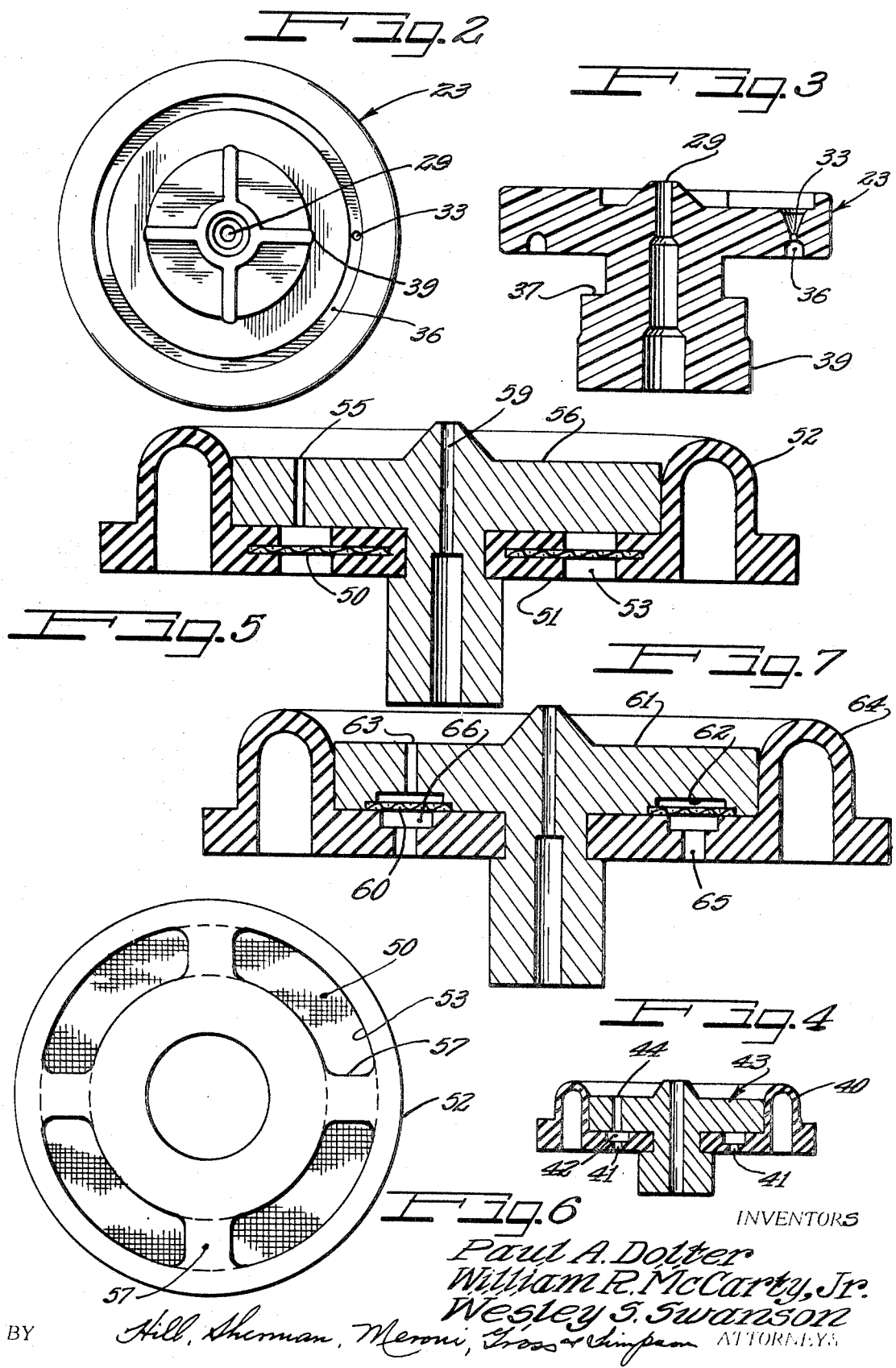

DIAPHRAGM ASSEMBLY FOR PRESSURE OPERATED PILOT CONTROLLED SHUTOFF VALVE

BACKGROUND OF THE INVENTION

Pilot controlled pressure operated diaphragm valves controlled by a pilot valve, which may be the solenoid of an armature, have frequently been used to control the flow of fluid in appliances and like apparatus. Such valves have included a diaphragm having a marginal sealing portion, a thin-walled annular bellowslike portion leading radially inwardly of the sealing portion and a thickened central portion having a central orifice leading therethrough, selectively closed by the pilot valve. One or two bleed holes of a smaller cross-sectional area than the cross-sectional area of the central orifice have been provided, leading either through the bellowslike portion of the diaphragm or through the central thickened portion of the diaphragm. Where the bleed hole leads through the bellowslike portion of the diaphragm, or the central thickened portion of the diaphragm, it is subject to distortion and erosion, with the result that the cross-sectional area of the central pilot orifice in time will become less than the cross-sectional area of the bleed hole. The main flow of fluid through the valve will then be closed off by flow through the bleed hole, and the valve will not open.

Also, where the cross-sectional area of the bleed hole becomes clogged or blocked by dirt, there will not be sufficient pressure on top of the valve to effect closing of the valve even when the central orifice leading through the valve remains closed.

In the design of pilot controlled pressure operated valves, it is advantageous for the central pilot orifice to be relatively close to the cross-sectional area of the bleed hole, in order to reduce the force requirement of the solenoid coil, controlling operation of the pilot valve with the advantage of a reduction in cost of the valve by the need for a smaller solenoid.

Any reduction in hole size, however, increases the chance of failure of the valve by dirt. For this reason, plastic inserts have been used having a bleed hole leg leading through the diaphragm with the bleed hole leading along the leg and plastic insert. While this prevents distortion of the bleed hole, which formerly lead through the diaphragm, the bleed hole of necessity, being of a relatively small diameter, is subject to clogging by dirt.

SUMMARY AND OBJECTS OF THE INVENTION

In the present invention we remedy the foregoing disadvantages heretofore present in pressure operated pilot controlled diaphragm valves by providing a plurality of screening holes leading through the thickened portion of the diaphragm, and providing a bleed hole of a smaller cross-sectional area than the pilot orifice leading through a reinforcing insert for the valve, with a communicating passageway between the screening holes, leading through the thickened portion of the diaphragm to the bleed hole leading through the plastic insert.

We further contemplate the provision of a filtering or screening medium in the communicating passageway, to further obviate the collection of dirt in the bleed hole leading through the plastic insert.

A principal object of the present invention, therefore, is to provide an improved form of diaphragm assembly arranged with a view toward preventing clogging or obstruction of the bleed hole, providing pressure to close the valve.

A further object of the invention is to improve upon the diaphragms heretofore used in pilot controlled pressure operated diaphragm valves by backing up the central portion of the diaphragm by a plastic insert having a central pilot orifice leading therethrough and at least one bleed hole spaced radially outwardly of the pilot orifice, and by providing a plurality of screening holes leading through the thickened portion of the diaphragm and a filtering passageway means between the screening holes leading through the diaphragm and the bleed hole leading through the plastic insert.

A further object of the invention is to improve upon the diaphragms heretofore used in pilot controlled pressure operated diaphragm valves by backing the central portion of the valve with a plastic insert having a central pilot orifice leading therethrough and a bleed hole spaced radially outwardly of the pilot orifice, and by providing a screen in the insert in registry with the bleed hole leading through the orifice and providing a series of holes leading through the central thickened portion of the diaphragm, and having communication with the screening means and bleed holes leading through the plastic insert.

Still another object of the invention is to provide a novel and improved form of diaphragm for pilot controlled pressure operated diaphragm valve in which the central portion of the diaphragm is backed by a plastic insert, having a central pilot orifice leading therethrough, and having a radially outwardly spaced bleed hole leading through the plastic insert, in which a screening means affords communication between the central thickened portion of the diaphragm and the bleed hole, and is so arranged as not to be subject to swell or erosion of the material from which the diaphragm is made and to provide the rigidity in the diaphragm for efficient operation thereof.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a partial fragmentary cross-sectional view taken through a pilot controlled pressure operated diaphragm valve constructed in accordance with the principles of the present invention.

FIG. 2 is a bottom plan view of a plastic reinforcing insert for the diaphragm, drawn to an enlarged scale, and illustrating certain principles of the present invention.

FIG. 3 is a transverse sectional view taken through the insert shown in FIG. 2.

FIG. 4 is a fragmentary cross-sectional view taken through the diaphragm and insert, illustrating a modified form in which the invention may be embodied.

FIG. 5 is a cross-sectional view taken through a diaphragm and insert illustrating still another form in which the invention may be embodied.

FIG. 6 is a bottom plan view looking at the thickened portion of the diaphragm shown in FIG. 5 from the bottom thereof; and FIG. 7 is a cross-sectional view taken through a diaphragm and insert constructed in accordance with the principles of the present invention, and illustrating still another modification of the invention.

DESCRIPTION OF PREFERRED EMBODIMENTS OF INVENTION

In FIGS. 1, 2 and 3 of the drawings, a pressure operated pilot controlled diaphragm mixing valve of a type particularly adapted for use in appliances is shown as comprising a valve body 10 having an inlet 11 leading thereinto and an outlet 12 leading therefrom. The valve shown may be a single shutoff valve. One valve only, therefore, need be shown and described herein. The valve body 10 has at least one cavity 13 therein, containing a diaphragm shutoff valve 15 and having an annular sealing groove 16 extending about an annular inlet passageway 17, for receiving a sealing bead 19 of the diaphragm 15.

The diaphragm 15 may be made from rubber or one of the well-known substitutes for rubber and is shown in FIG. 1 as being seated on an annular port 20 on a central annular disklike portion 21 of the diaphragm. The outer margin of the disklike portion of the diaphragm terminates into an upwardly extending bellowslike convolution 22 extending along the outer margins of a plastic insert and backing member 23, for the central disklike portion of the diaphragm. The convolution 22 is connected with the sealing bead 19 and forms an integral part thereof.

The sealing bead 19 is retained in sealing engagement with the sealing groove 16 as by an armature guide 24, retained to the valve body 10 by a retainer plate 25, as shown and described in an application Ser. No. 816,714, filed by William R. McCarty, Jr. on Apr. 16, 1969 and entitled "Shut-off off Valve and Armature Guide Therefor," so not herein shown or described in detail. The armature guide 24 forms a guide for an armature 26 having a pilot valve 27 at its lower end cooperating with a pilot orifice 29 leading through the center of the plastic insert 23 to control opening and closing of the valve. The armature 26 is biased by a spring 30 to engage the pilot valve 27 with the orifice 29 and is moved out of engagement with said orifice by energization of a solenoid coil 31, encircling said armature, in a conventional manner.

The inside of the armature guide 24 is spaced from the diaphragm 15 and insert 23 and with said diaphragm and insert forms a pressure chamber 32 for the building up of fluid under pressure from the inlet 11 to effect closing of the valve upon closing of the pilot orifice 29 by the pilot valve 27, and the flow of fluid from the inlet into the chamber 32 through a bleed orifice 33, leading through the insert 23.

The thickened central portion of the diaphragm 15 also has a plurality of screening holes or orifices 35 leading therethrough, shown as being on the same circumferential line as the bleed hole 33, and leading to an annular downwardly opening groove 36 in the insert 23, and having communication with the screening holes 35 and with the bleed hole 33, to supply inlet fluid to flow through said bleed hole and maintain the valve closed as the plot valve 27 closes the central orifice 29. The groove 36 is thus sealed to the thickened portion 21 of the diaphragm 15 by engagement of the thickened portion of said diaphragm with a shouldered portion 37 of said insert. The insert 23 is secured to the diaphragm 15 by flexing the diaphragm over and about a depending guide portion 39 of said insert into the groove forming the shouldered portion 37 of said insert. Said guide portion 39 is adapted to have guiding engagement with the interior portion of the outlet 12.

With the construction just described, the annular groove 36 leading to the bleed hole 33 and supplied with inlet pressure from any one or all of the screening orifices 35 enables the insert to be readily assembled to the rubber diaphragm and to thereby reduce the cost of manufacturing the valve. The screening orifices 35 also in effect provide a screen in alignment with the downwardly opening groove 36, preventing clogging of the bleed hole 33 by a single dirt particle and thereby in effect filtering dirt particles from the bleed hole 33.

It should further be understood that the screening holes 35 are of sufficient diameter that the valve will operate with only one unclogged screening hole in the diaphragm, and that the only way large pieces of dirt can cause a problem is by clogging all of the screening holes 35.

It may further be understood that the diaphragm assembly just described provides a fine filtering device, located where required without hindering the main flow of fluid through the valve, and where the main flow of fluid through the valve can actually flush and cleanse the screening holes 35 each time the valve is opened.

In the form of the invention illustrated in FIG. 4, we have shown a diaphragm 40 similar to the diaphragm 15, and having a plurality of screening holes 41 leading therethrough, having communication with an annular channel 42 opening to the undersurface of a plastic insert 43. The insert 43 is similar to the plastic insert 23, but is shown as having a single bleed orifice 44 leading therethrough, to supply fluid to maintain the valve closed as the pilot valve 27 closes a central pilot orifice 45, leading along said insert.

The foregoing modification operates in the same manner of the form of the invention illustrated in FIGS. 1, 2 and 3, but simplifies the molding of the plastic insert and also simplifies the punching or molding of holes in the diaphragm, since the cross-sectional thickness of the rubber along the annular groove 42 is reduced. The screening action of the diaphragm valve, operates in the same manner as in the form of the invention illustrated in FIGS. 1, 2 and 3.

In FIGS. 5 and 6 of the drawings, we have shown a three piece diaphragm valve assembly having a screen 50 molded in a thickened portion 51 of a diaphragm 52, similar to the diaphragms 15 and 40. The screen 50 is shown in FIG. 5 as molded between the top and bottom portions of the thickened portion of the diaphragm in an annular channel 53, having communication with a single bleed hole 55 leading through a plastic insert 56. Ribs 57 extend across the annular channel 53 free from the screen, to accommodate the passage of fluid through the screen and bleed hole 55, to effect closing of the valve by pressure upon closing of a central pilot orifice 59 by the pilot valve 27.

The screen 50 may be a plastic or metal screen or a metal washer having a series of fine holes punched or drilled therein and eliminates the problems of hole size changes due to swelling of the rubber of the diaphragm, or deterioration of the diaphragm, inherent in rubber diaphragms.

In FIG. 7 of the drawings, we have illustrated still another modified form in which the invention may be embodied. This form of the invention is similar to the form illustrated in FIGS. 5 and 6 except an annular screen 60 is molded or otherwise mounted in the undersurface of a plastic insert 61 for a diaphragm 64 and has communication with an annular passageway 62 communicating with a bleed orifice 63 leading through said insert. The diaphragm 64, like the diaphragms 15, 40 and 52, has a plurality of relatively large holes 65 extending therethrough in communication with an annular channel 66 communicating with the screen 60 and channel 62.

While a channel 66 is herein shown, this channel need not necessarily be provided as long as the holes 65 lead to the screen 60 and channel 62. The channel 66, however, may aid in flushing dirt from the undersurface of the screen. The holes 65 are also designed to be large enough to be unaffected by swell or deterioration of the rubber of the diaphragm.

The screening shown in FIGS. 5, 6 and 7 may be of a small mesh and lower the incidence of the armature or pilot valve jamming in its guide, and thereby permit closer clearances between the guide and armature and an increase in the armature mass, with a resultant increase in the efficiency of the magnetic circuit, where the valve is solenoid operated.

With the structure just described, a smaller bleed orifice leading through the plastic insert may be provided than has heretofore been practical, giving the valve a slower close-off rate, and thereby reducing water hammer and premature failure of the plumbing, caused by high pressure shocks, and permitting the use of a smaller central pilot orifice and thereby reducing the force required to operate the valve, with a resultant reduction in cost of the valve.

The screening of the dirt from the chamber 32 before it reaches the armature guide and pilot valve also reduces wear of the guide by the reciprocating armature and reduces wear at the inner face of the plastic insert with the convolution 22 of the diaphragm and prevents particles of dirt from becoming imbedded in the pilot valve and thereby reduces failure in closing of the valve, as well as reducing erosion caused by entrained dirt in the fluid as it passes through the bleed orifice of the diaphragm and central pilot orifice thereof.

We claim as our invention:

1. In a solenoid controlled pressure operated diaphragm shutoff valve,
   a valve body having a valve cavity therein,
   an inlet passageway opening to said cavity and having communication with a source of fluid under pressure,
   an outlet port,
   an annular valve seat disposed radially inwardly of said inlet passageway and having communication with said outlet port,
   an annular sealing groove extending about said outlet port, a flexible diaphragm cooperating with said annular valve seat to control the flow of fluid between said inlet passageway and said outlet passageway and sealed along its margin in said sealing groove, said diaphragm having a thin-walled bellowslike annular portion disposed inwardly of its peripheral portion and a disklike central portion, a relatively rigid insert backing up said disklike central portion and having a disklike portion reinforcing said diaphragm, on one side thereof and a central guide portion extending through said diaphragm beneath said disklike central portion of said diaphragm and having guiding engagement with said outlet passageway, a central pilot orifice leading through said central guide portion of said insert and having communication with said outlet, an armature having a valve on the end thereof cooperating with said central pilot orifice, to open and close said orifice, a solenoid coil energizable to move said armature to open said orifice, bleed means leading through said diaphragm and said insert and providing pressure to close and maintain said valve closed upon closing of said pilot orifice by said armature, said bleed means comprising a plurality of circumferentially spaced screening holes leading through said diaphragm, a single bleed hole leading through said insert and of smaller cross-sectional area than the cross-sectional area of said central plot orifice, and passageway means between said circumferentially spaced screening holes and said single bleed hole leading through said insert.

2. The solenoid controlled fluid pressure operated diaphragm shutoff valve of claim 1, wherein the insert is a plastic insert, and wherein the passageway means is an annular passageway in the disklike central portion of said diaphragm and communicates with said screening holes and has communication with said central bleed hole leading through said insert.

3. The solenoid controlled fluid pressure operated diaphragm shutoff valve of claim 1, wherein the insert is a plastic insert, and wherein the passageway means between said circumferentially spaced screening holes leading through said diaphragm and said single bleed hole leading through said insert comprise an annular passageway in said insert having communication with said bleed hole in said insert and opening to said diaphragm and having communication with said circumferentially spaced screening holes.

4. The solenoid controlled fluid pressure operated diaphragm shutoff valve of claim 1, wherein the circumferentially spaced screening holes leading through said diaphragm comprise a screen molded in the disklike central portion of said diaphragm and an annular passageway leading from said screen and having communication with said bleed hole leading through said insert.

5. The solenoid controlled fluid pressure operated diaphragm shutoff valve of claim 1, wherein the communicating passageway means between said screening holes leading through said diaphragm and said bleed hole leading through said insert, comprise an annular passageway in said insert opening to said diaphragm and a screening in said annular passageway and having communication with said screening holes leading through said diaphragm.

6. A flexible diaphragm valve made from a resilient material and particularly adapted for a pilot controlled pressure operated valve, comprising, a diaphragm having a peripheral sealing portion, an inner annular bellowslike portion and a central disklike portion forming a shutoff valve, a rigid plastic insert backing up said central disklike portion and sealed thereto, said annular bellowslike portion extending about the periphery of said plastic insert and outwardly therefrom and terminating into said peripheral sealing portion, said insert having a central guide boss leading through said central disklike portion of said diaphragm, having a central pilot orifice leading therethrough, and having one bleed hole spaced radially of said central pilot orifice and of a lesser cross-sectional area than the cross-sectional are of said central pilot orifice, a plurality of circumferentially spaced screening holes leading through said disklike portion of said diaphragm, and communicating annular passageway means between said screening holes and said bleed orifice.

7. A flexible diaphragm in accordance with claim 6, wherein the communicating passageway means is an annular passageway in the insert and opening to said screening holes and having communication with said bleed orifice.

8. A flexible diaphragm in accordance with claim 6, wherein the communicating passageway means is an annular passageway in said central disklike portion of said diaphragm and opening to said insert.

9. A flexible diaphragm in accordance with claim 6, wherein the screening holes in said diaphragm comprise a screen molded in said central disklike portion of said diaphragm and an annular passageway in registry with opposite sides of said screen and with said bleed hole leading through said orifice.

10. A flexible diaphragm in accordance with claim 6, wherein the communicating passageway means comprises an annular passageway in said insert, opening to said disklike portion of said diaphragm, and having a screen extending thereabout.